United States Patent [19]

Houghton et al.

[11] Patent Number: 4,901,540
[45] Date of Patent: Feb. 20, 1990

[54] RETIFIER COLUMS FOR VAPOUR GENERATORS

[76] Inventors: Fred Houghton, Danesbury, 255 Park Road, Hartlepool, Cleveland TS26 9NL; Paul Holmes, 14 Hayling Way, Hartburn, Stockton-on Tees TS18 50F, both of Great Britain

[21] Appl. No.: 207,808
[22] Filed: Jun. 17, 1988

[30] Foreign Application Priority Data

Jun. 18, 1987 [GB] United Kingdom ............... 8714337

[51] Int. Cl.⁴ .............................................. F25B 33/00
[52] U.S. Cl. ....................................................... 62/495
[58] Field of Search ................................... 62/476, 495

[56] References Cited

U.S. PATENT DOCUMENTS

| | | | |
|---|---|---|---|
| 2,240,177 | 4/1941 | Coons et al. | 62/495 X |
| 2,271,542 | 2/1942 | Coons | 62/495 X |
| 2,556,753 | 6/1951 | Galstaun et al. | |
| 3,658,655 | 4/1972 | Heere | |

FOREIGN PATENT DOCUMENTS

| | | |
|---|---|---|
| 368948 | 6/1963 | Switzerland . |
| 982452 | 2/1965 | United Kingdom . |
| 2164395A | 3/1986 | United Kingdom . |

Primary Examiner—Lloyd L. King

[57] ABSTRACT

A rectifier column for a vapor generator means of a heat transfer system having a reflux inlet and modulating means at said inlet responsive to a condition representative of the quality of the vapor being generated so as to control the flow of reflux into the column thereby maintaining optimum vapor generation. In one arrangement the modulating means comprises a temperature sensitive actuator, e.g. a wax filled bellows which is situated in the path of the generated vapor at the output of the column.

16 Claims, 4 Drawing Sheets

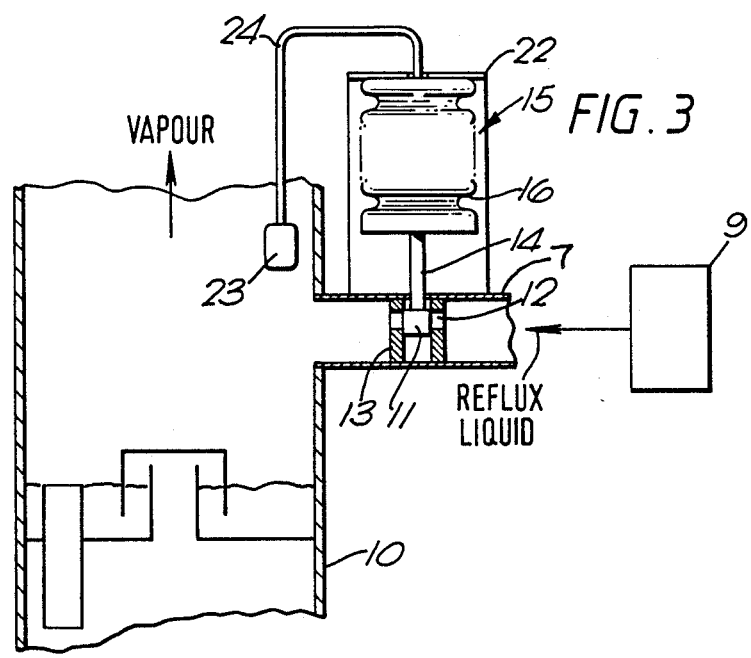
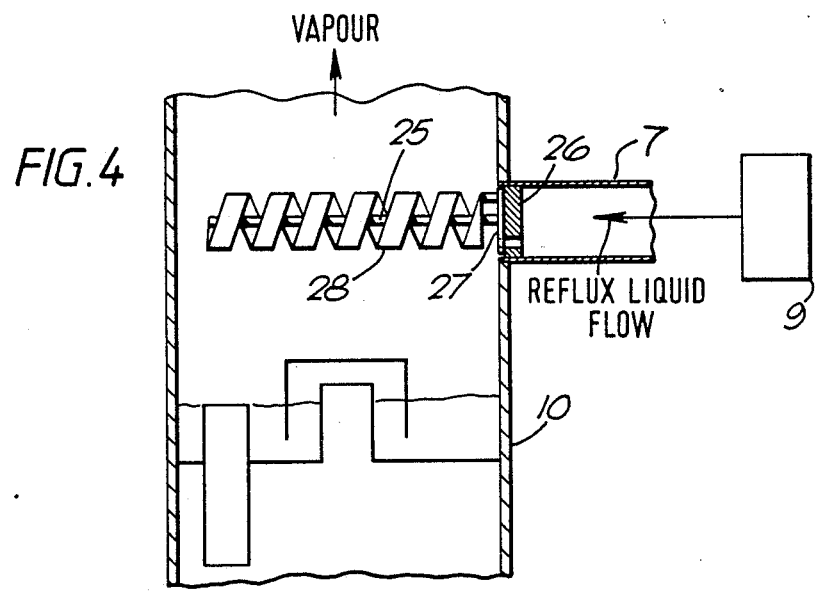

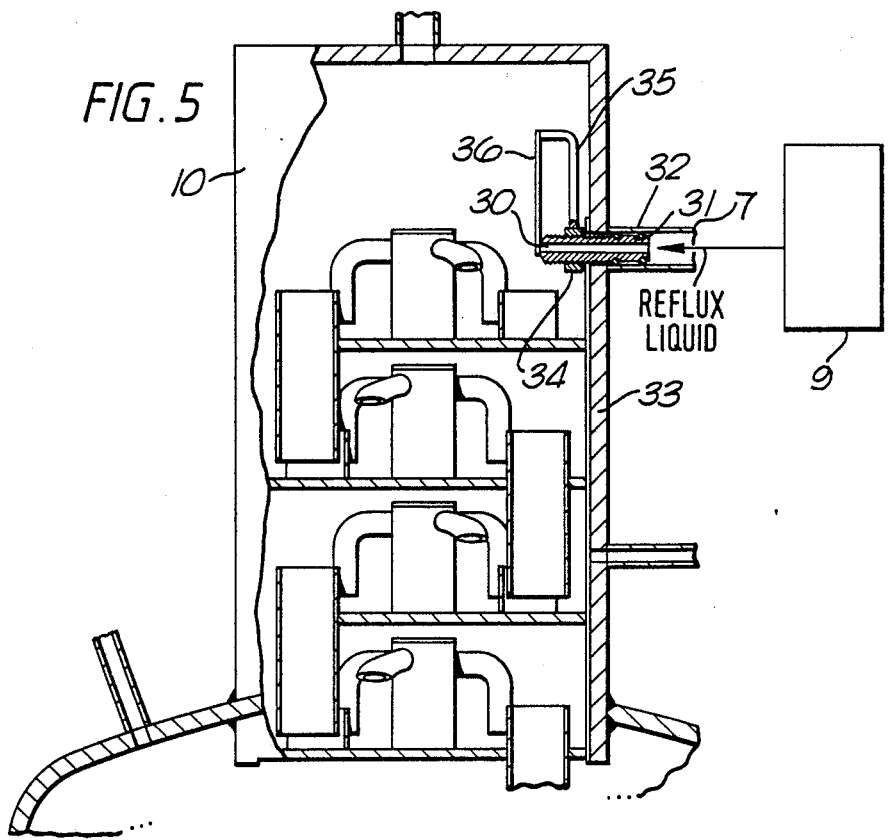
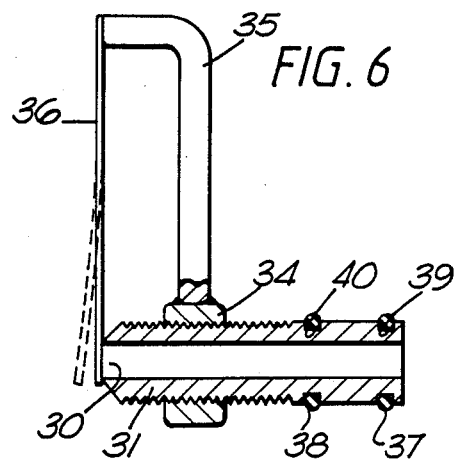

RETIFIER COLUMS FOR VAPOUR GENERATORS

This invention relates to a rectifier column in which one component is separated from a mixture of components and purified. In particular it relates to a rectifier column having means for controlling a condensate supplied thereto to provide optimum operating conditions.

In prior rectifier columns vapor, generated by a so-called reboiler, ascends the column through trays which collect intermediate concentrations of mixture by achieving an equilibrium in each tray between vapor ascending through the column and a liquid condensate descending through the tray system. Heat and mass are transferred in each tray by inducing turbulent contact of liquid and vapor phases so that ascending vapors are enriched with volatile components from the descending liquid while less volatile gases condense to dilute the descending liquid, thereby ensuring that ascending vapor is progressively concentrated while descending liquid is progressively diluted. A portion of the purified vapor provided by the column is condensed within the column by means of an internal heat exchanger to form the liquid condensate that is fed to the top tray and which passes down through the tray system to establish the aforesaid equilibrium conditions, so purifying the ascending vapor. This condensed vapor is termed reflux and directly affects product quality. If the quantity of reflux is too low, vapor concentration cannot occur to the required extent and the purity of the rectified vapor is unacceptably low, but if the quantity of reflux flow is too high, then the quantity of product, though of high quality, falls. Moreover heat is wastefully transferred from the reboiler to the rectifier column condenser. With prior columns, in order to preserve the heat energy supplied to the system, fluids from elsewhere in the system are supplied to the heat exchanger as the coolant. The generation of reflux is uncontrolled and there is usually a surfeit thereof. It is desirable to optimize this reflux flow in a rectifier column.

Accordingly the invention provides a rectifier column for receiving a vapor output of a vapor generator, means for deriving reflux from the rectifier column output vapor externally of the column and means for modulating the flow of the reflux from said external means to the rectifier column. In arrangements disclosed herein the reflux is obtained from a main system condenser which condenses the vapor output of the rectifier column and returns a portion as the reflux. Other arrangements are envisaged, though not described, in which an independent external condenser is employed for the purposes of generating the reflux.

Hereinafter the invention is further described in relation to a number of embodiments illustrated in the accompanying drawings, wherein:

FIG. 3 shows a further arrangement of the reflux column having a modified form of reflux modulating valve;

FIG. 4 shows yet another form of modulating valve for the rectifier column;

FIG. 5 shows a typical rectifier column in section and including yet a further form of modulating valve for modulating the flow of reflux liquid;

FIG. 6 shows the construction of the modulating valve of FIG. 5 in greater detail.

Figure 1:
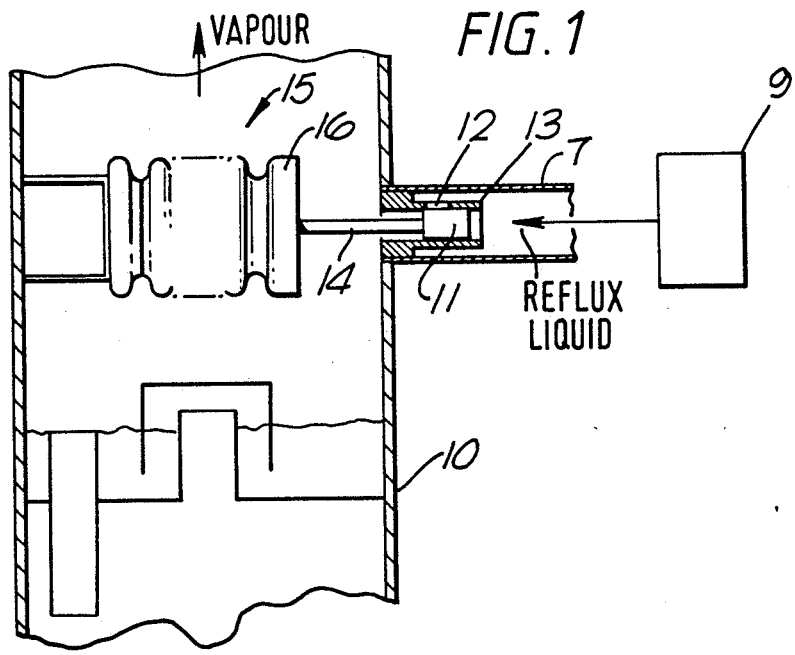
FIG. 1 shows in diagrammatic form part of the rectifier column of a boiler showing the reflux liquid input incorporating a flow modulating valve.
Figure 2:
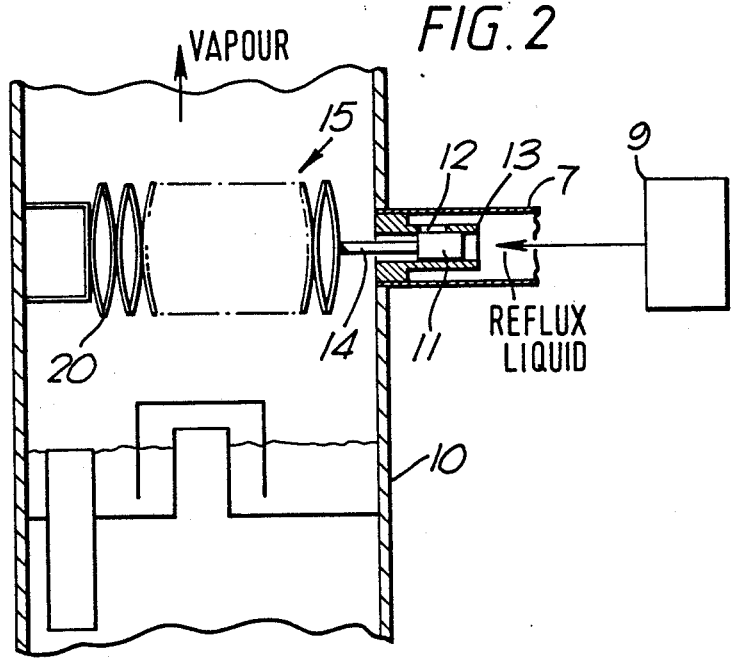
FIG. 2 illustrates an alternative valve arrangement in the reflux column of FIG. 1.

In the arrangements of FIGS. 1-3, reflux flow from a condenser 9 into the rectifier column 10 via a conduit 7, the rate of flow being controlled by a controlled by a slidable piston 11 which progressively opens or closes an orifice 12 in the side wall of a cylinder 13 in which the piston slides. Thus the piston and the cylinder arrangement take the form of a spool valve. The piston is connected to a rod 14 which is moved by means of an actuator 15. The latter may take several forms and may be variably positioned. In the arrangement of FIG. 1 the actuator is a bellows 16 which contains an expansible medium such as wax and which is housed within the rectifier column and situated in the environment of the output vapor. Increase of temperature within the column in the vicinity of the bellows causes a greater opening of the reflux valve and hence an increased reflux, conversely a drop in temperature reduces the reflux input into the column. With the normal solutions in use, e.g. ammonia in water, a drop in temperature occurs as the ammonia content in the solution is increased; thus there is provided a position feedback control for the device. By controlling the reflux in this way it is possible to operate the rectifier column automatically to provide optimum conditions.

The valve shown in FIG. 2 has essentially a similar action to that previously described but with a different actuator 15. In this case it comprises a set of bimetal strips or discs 20 coupled face to face so as to provide a movement of the actuating member as the temperature varies in the rectifier column which is equal to the summed movement of all the strips or discs.

In FIG. 3 a somewhat different physical arrangement is shown. The spool valve, though illustrated adjacent to the rectifier column, may in fact be remote therefrom. The bellows 16 is contained in a housing 22 which may be sited at a position which is intermediate the rectifier column 10 and the reflux condenser 9 and it may also be at ambient temperature. The bellows is linked to a sensor bulb 23, which is shown contained within the rectifier column, by means of suitably connecting tubing 24 and the whole actuator system is filled with an expansible wax. When the temperature of the bulb changes the wax within it expands or contracts, thereby causing wax to be forced into the bellows or removed therefrom via the aforesaid tubing and causing actuation of the spool valve. This arrangement facilitates a simplification in the construction of the rectifier column, but the latter is not the only possible location for the bulb, as there are other locations within systems in which rectifier columns are used, where the temperature of fluids are related to the quantity of reflux required at any instant for optimum performance; downstream of an expansion valve in a heat pump is one such position.

A further alternative, this time again situated in the rectifier column, is shown in FIG. 4. It comprises a post 25 extending into the interior of the rectifier column, attached at one end to a plug 26 in the reflux inlet and having a free end. An apertured disc closure member 27 co-operates with an orifice in the plug 26 and is rotatably mounted upon the post. A helical element 28 formed from a bimetal strip has a first end attached to the disc at a radial position thereon and a second end attached to the free end of the post. As the temperature within the rectifier column changes so the diameter of the helical element changes, resulting in the rotational displacement of the end coupled to the disc. By such means the aperture in the plug is obstructed to a greater or a lesser degree by the disc, thus modulating the flow of reflux from the condenser 9.

Referring now to FIGS. 5 and 6, there is shown a typical rectifier column 10 fitted with yet a further form of reflux modulating valve. This is essentially an orifice 30 defined by a tube 31 which may be a simple sealing push fit into the reflux inlet duct 32 which enters the rectifier column through its vertical wall 33 and forms an end part of the conduit 7, A threaded collar 34 (best seen in FIG. 6) is carried on a corresponding threaded portion of the tube and to the collar is attached a dogleg support arm 35 which tends to overhang the orifice. A bimetal strip 36 is attached to the dogleg of this support arm at one end which at its other end co-operates with orifice 30 in the tube 31 to control the flow of reflux liquid therethrough. The bimetal strip is mounted with an orientation which causes it to engage the tube when the temperature around the reflux input falls and to move away therefrom when the temperature rises. In this way because the temperature falls with increasing ammonia content in the solution in the trays, the cooler vapor passing the bimetal strip tends to close the valve, and as the temperature rises due to reduced ammonia the valve tends to open to admit further quantities of reflux.

The operation of the valve may be adjusted by rotating the collar on the tube, which by virtue of the threaded engagement, causes it to move in an axial direction therealong. Conveniently, once set, it is locked in position by means of a set screw (not shown). Also conveniently the collar may take the external form of a nut (not shown) for easy adjustment.

Sealing engagment of the tube 30 in the reflux inlet duct 32 is provided by means of a pair of "O" rings 37, 38, which are respectively partially housed in circumferential slots 39, 40 provided on the external surface of the tube. These "O" rings engage the inner surface of the reflux inlet duct 32 when the valve is inserted therein.

Figure 7:
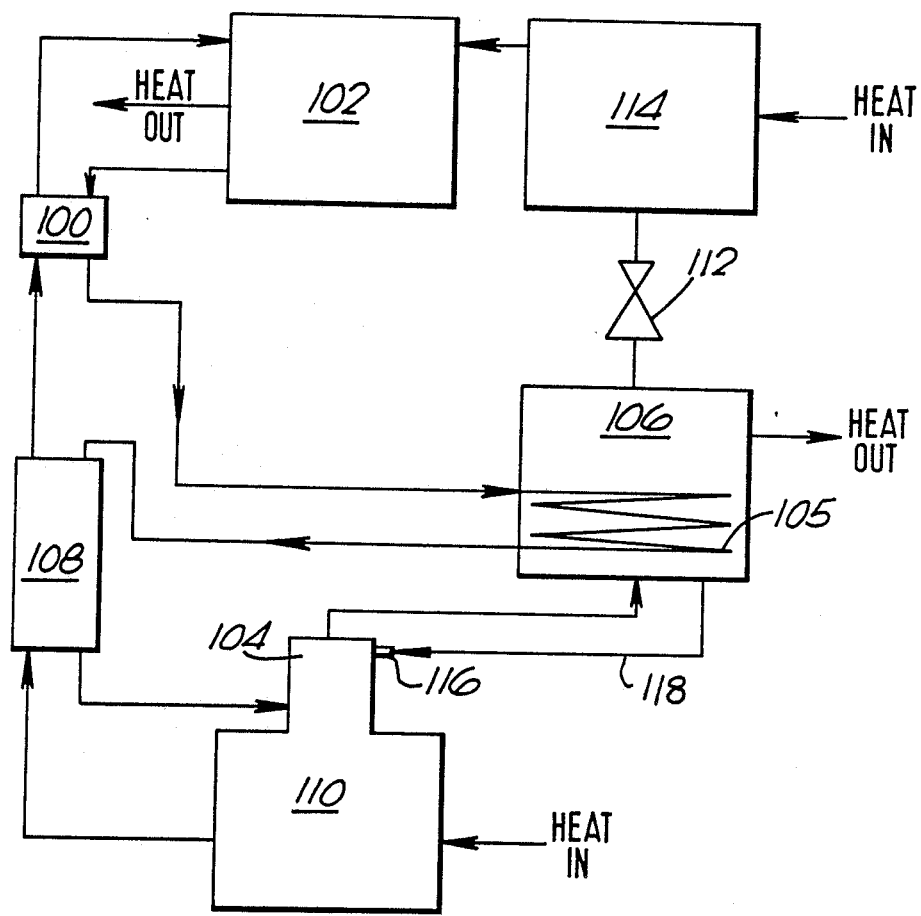
FIG. 7 shows a novel heat pump system embodying the rectifier column fitted with a modulating valve according to the invention.

An example of a novel advantageous heat pump system which has been realized by the use of a present reflux valve is disclosed in FIG. 7 which illustrates the aspects of the system concerned with the transportation of the system fluid mediums. A pump 100 pumps a strong solution from the absorber 102 to the rectifier column 104 via a heat receiving coil 105 in the condenser 106 and a weak/strong solution heat exchanger 108, on both occasions picking up heat from other fluids in the system. This pumped solution gives off a volatile fraction in the rectifier column and the remainder drains as a weak solution into the generator 110 where it receives further heat and as a consequence releases even more vapor. The heated but weakened solution is ducted to the pump as its working fluid, passing thereto via the heat exchanger 108 where some of its sensible heat is transferred to the aforesaid strong solution passing in the opposite direction. From the working chamber of the pump the weak solution flows into the input of the absorber 102 to complete the circulation of the solution.

Vapor leaving the rectifier column 104 is ducted to the condenser 106 where its latent heat is removed. The condensate is split at the condenser, a fraction thereof being returned as reflux to the rectifier column 104 via a conduit 118 and the reflux valve 116, while the major proportion flows through an expansion valve 112 from there into an evaporator 114 where it is vaporized. The vapor is ducted to the absorber 102 where it enters into solution in the soluble medium of the system.

For optimum operation the split in the condensate has to be controlled. This control is performed by the reflux valve 116 situated at the reflux inlet to the rectifier column. The control is exercised in one of the manners hereinbefore described.

The use of a single condenser 106 to provide both reflux and the liquid phase to the main system simplifies the construction of the apparatus and therefore reduces costs. It is made possible only by the presence of reflux valve 116. The purpose in feeding the strong solution through the heat exchanger coil 105 in condenser 106 and through the solution heat exchanger 108 is to preserve and make use of the heat supplied to the system via the generator 110 as long as possible. Analysis shows that, as a general proposition, the greater the work done by the heat supplied through the boiler, the greater is the heat transferred from the environment to the point where it is put to use.

We claim:

1. A vapor rectifier column comprising a vapor output, a vapor reflux inlet coupled to a reflux source, modulating means disposed at said inlet for controlling the flow of reflux into said column, and temperature sensitive means located at an upper portion of said column, wherein said temperature sensitive means is responsive to the temperature of vapor occurring at said upper portion of said column, and said modulating means is actuated by said temperature sensitive means to maintain said vapor at an optimum concentration 2. A column according to claim 1 wherein said modulating means comprises a spool valve.

3. A column according to claim 2 wherein said spool valve comprises a bellows actuator.

4. A column according to claim 3 wherein said bellows actuator is disposed within said rectifier column and comprises a substance that expands with increasing temperature and contracts with decreasing temperature, the degree of expansion or contraction of said substance controls the extension of said bellows and the setting of said spool valve.

5. A column according to claim 3 wherein said bellows actuator is disposed externally of said column and said column further comprises an expansion bulb disposed in said rectifier column and a duct coupling said expansion bulb and said bellows actuator, wherein said expansion bulb contains said substance, and the degree of expansion or contraction of said substance controls the extension of said bellows actuator and the setting of said spool valve.

6. A column according to claim 1 wherein said modulating means comprises a linear, serially coupled, plurality of bimetallic elements which act together in response to the temperature of vapor at said upper portion of said column to position said spool valve.

7. A column according to claim 1 wherein said modulating means comprises a disk valve which is angularly positioned by a bimetallic element which, in response to changes in temperature of vapor at said upper portion of said column is adapted to turn said disk about an axis so as to open and close said valve.

8. A column according to claim 1 wherein said modulating means comprises a valve having a cantilevered bimetallic strip which is adapted to open and close said valve in response to changes in temperature of vapor at said upper portion of said column.

9. A heat transfer apparatus comprising a closed fluid circulatory system comprising vapor generator means, condenser means coupled to receive vapor generated by said vapor generator means, a vapor rectifier column coupled to and surmounting said vapor generator means, said vapor rectifier column receiving ascending vapor output from said vapor generator means, conduit means connecting said condenser means to an upper portion of said rectifier column, said conduit means conveying condensate from said condenser means as a reflux to said rectifier column, said condensate influencing the production of vapor in said rectifier column, reflux modulating means for controlling the flow of condensate through said conduit into said rectifier column, said reflux modulating means including sensing means for determining the temperature of vapor at said upper portion of said rectifier column and means responsive to said sensing means for modulating the instantaneous flow of condensate through said conduit in relation to the temperature of vapor at said upper portion of said rectifier column whereby vapor generated by said rectifier column has an optimum concentration.

10. Apparatus according to claim 9 wherein said reflux modulating means comprises a spool valve.

11. Apparatus according to claim 10 wherein said spool valve comprises a bellows actuator.

12. Apparatus according to claim 11 wherein said bellows actuator is disposed within said rectifier column and comprises a substance that expands with increasing temperature and contracts with decreasing temperature, and wherein the degree of expansion or contraction of said substance controls the extension of said bellows actuator and the setting of said spool valve.

13. Apparatus according to claim 11 wherein said bellows actuator is disposed externally of said rectifier column and said apparatus further comprises an expansion bulb disposed in said rectifier column and a duct coupling said expansion bulb and said bellows actuator, wherein said expansion bulb contains said substance, and the degree of expansion or contraction of said substance controls the extension of said bellows actuator and the setting of said spool valve.

14. Apparatus according to claim 10 wherein said reflux modulating means comprises a linear, serially coupled, plurality of bimetallic elements which act together in response to the temperature of vapor at said upper portion of said rectifier column to position said spool valve.

15. Apparatus according to claim 9 wherein said reflux modulating means comprises a disk valve which is angularly positioned by a bimetallic element which, in response to changes in temperature of vapor at the upper portion of said rectifier column is adapted to turn said disk about an axis so as to open and close said valve.

16. Apparatus according to claim 9 wherein said reflux modulating means comprises a valve having a cantilevered bimetallic strip which is adapted to open and close said valve in response to changes in temperature of vapor at said upper portion of said column.

* * * * *